July 26, 1966 R. B. SMITH 3,262,684
DISTILLATION COLUMN
Original Filed Jan. 15, 1962
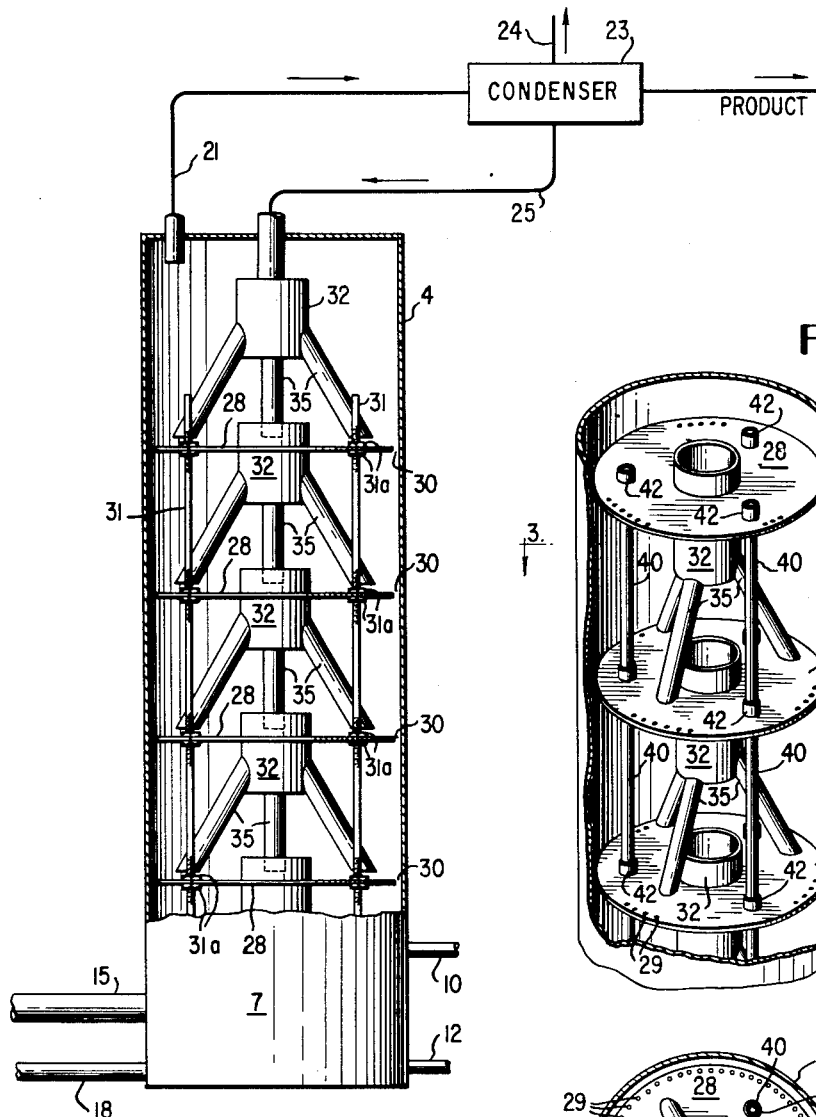
FIG.1 FIG.2 FIG.3
INVENTOR.
READING B. SMITH
BY
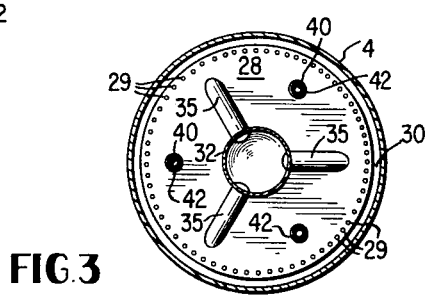
ATTORNEYS United States Patent Office 3,262,684
Patented July 26, 1966

3,262,684
DISTILLATION COLUMN
Reading B. Smith, Flossmoor, Ill., assignor to Sinclair Research, Inc., New York, N.Y., a corporation of Delaware
Continuation of application Ser. No. 166,068, Jan. 15, 1962. This application Mar. 19, 1965, Ser. No. 441,287
4 Claims. (Cl. 261—114)

This application is a continuation of application S.N. 166,068, filed January 15, 1962.

The present invention relates to distillation columns containing removable trays.

With the current increased emphasis on scientific research and development there has been a commensurate demand in industry for small or intermediate size distillation columns that will handle relatively small volumes of liquid. However, up to the present time, it has usually been found more expedient to build large distillation columns, i.e., at least about three feet in diameter, so that workmen can easily crawl into the column to install, clean, remove or repair the trays or other column equipment. In small vertical columns, say of less than 2 to 3 feet in diameter where this is not feasible, it is common to avoid the use of horizontal trays and to pack the entire column with a continuous mass fo loose bodies which will effect contact between the descending liquid and ascending vapors. Small packed columns, however, are less efficient than tray columns and are not very predictable. After a period of time "tunneling" or uneven flow of fluid may occur thereby requiring frequent cleaning.

Small distillation columns have been made, for example, by stacking one section on top of another with a tray between each section and bolting the sections together. Such columns are expensive to construct because of their many parts and are also uneconomical from the standpoint of cleaning since the whole or major part of the column may have to be dismantled in order to clean one tray. Other small distillation columns commonly employed are those wherein a tight-fitting sealing means such as a gasket is provided between the tray and column wall to prevent "by passing" flow, that is, flow of vapor or liquid from a tray to another non-adjacent tray. Columns employing these sealing means, however, have in general proved unsatisfactory or expensive. Gaskets for example, have a limited temperature range, cannot be used with many solvents and may blow out. Moreover, a number of other difficulties are encountered when the gaskets are installed and removed. Seal means other than gaskets have been found in general to be less than desirable in effectiveness and are cumbersome to install and remove.

It is the purpose of the present invention to provide an efficient distillation column, having trays that are easily removable, so that the necessity of having workmen enter the column is eliminated, and that requires no sealing means or gaskets around the periphery of the trays. Although the apparatus of the present invention has particular applicability to relatively small distillation columns, i.e., of less than about 2 to 3 feet in diameter, it is not necessarliy limited thereto and can be applied to large columns.

Briefly, according to the invention, the distillation column comprises a closed vertical generally cylindrical shell having a feed inlet means and a product outlet means. The shell is provided with a plurality of separately removable generally circular trays having a smaller diameter than the internal diameter of the shell so that a small peripheral vapor passage is provided between the edge of each tray and the shell wall. The distance between the internal shell wall and the tray edge should be small but not so small that the tray would lock into place by corrosion or heat expansion, thus preventing the removal of the trays. In many cases the diametric ratio of the internal shell to the outer tray periphery will be about 1.05 to 1.15. These small peripheral vapor passages form bubbling zones in the apparatus of the present invention. In order to use the peripheral vapor passages and tray edges as a bubbling zone weirs are extended above and below each tray and the weirs with the possible exception of the lowermost weir are provided with one or a plurality of spouts positioned to transport descending liquid to the peripheral edges of the lower adjacent tray. If desired, sieve holes or bubble caps can be placed around the outer edges of each tray to increase the bubbling area. The trays can be held in place by any suitable releasable holding or supporting means, for instance, by intermediately disposed supporting legs or by one or more threaded rods through the trays with nut spacers above and below each tray. In the latter case, since all the trays can be connected together, they can be pulled at once.

The apparatus of the present invention may be better understood by references to FIGURES 1 to 3 wherein FIGURE 1 is a vertical sectional view of the column constructed in accordance with the invention;

FIGURE 2 is a view in perspective, partly in section of the column;

FIGURE 3 is a view in section view taken on line 3—3 of FIGURE 2.

Referring to the drawings, the column comprises a cylindrical shell 4 having a heating means such as reboiler 7, preferably removably attached to the base of the shell 4, as by means of bolts, in order to facilitate accessibility into the inside of the shell for repair, cleaning, etc. The reboiler is provided with a suitable heating coil (not shown) and heating fluid may be circulated through the coil via conduits 10 and 12. Liquid to be distilled is introduced into the reboiler 7 by means of line 15 and a liquid bottoms or distillation residue may be withdrawn through an outlet 18 from the reboiler 7.

The shell 4 contains a plurality of circular trays 28, each having a diameter slightly smaller than the diameter of the shell so that a small annular vapor passage area 30 is provided between the edge of the tray and the internal wall of shell 4. Each of the trays has an approximately centrally-located weir 32 welded to the tray and extending through the tray. The weirs rise above their respective tray levels to a height corresponding to the intended liquid level. All of the weirs 32, save the lowermost, is provided with a plurality of spouts 35 projecting from the base of the weir, which spouts are positioned to transport descending fluids to the peripheral edges of the next lower tray. The spouts 35 extend down to level just above the next lower tray and are attached to the base of the weir 32 an an angle that places the outlet of each of the spouts over a point on the next lower tray toward the tray edge that is preferably beyond at last about half the radius of the tray and of course beyond the weir. In other words, the angular pitch of the spouts is such that descending liquid will be disposed onto the next lower tray near the peripheral surface thereof but not so great as to transport the entire liquid directly into the annular vapor passage area 30, which constitutes the bubbling zone of each tray section. This bubbling area can be increased, if desired, by placing small sieve holes 29 around the peripheral edge of the tray as shown, for example, in FIGURE 3. Bubble caps may also be used if desired. The exact angle at which the spouts are positioned is dependent, for instance, on the diameters of the shell, weir and spout and the distance between trays. The number of spouts provided each weir is generally at least two, preferably at least three or four or more. The weir 32 of the lowermost tray may be longer and extends downward to beneath the liquid level in the reboiler.

The trays are held in place by three or more threaded rods 31 (only two of which are shown) which extend through each of the trays at equidistant points, the trays with nut spaces 31a applied above and below each tray The four threaded rods extend to the bottom of the tower where they rest to hold the connected trays in position within the tower. If desired the connected trays can be suspended from the top of the tower via the top of the threaded rods in which case only one or two rods need be employed. Connecting the trays in this manner can be advantageous in that all of the trays can be pulled at once by hooking the threaded rods to any suitable pulling means. Alternatively, as shown in FIGURE 2, for example, the trays can be separated from one another by any suitable separating means such as legs 40 inserted between the trays at points intermediate the respective weirs and tray edges. Receiving means such as leg caps 42 for the legs 40 can be provided the top of each tray. The leg caps extend above the tray level a height that provides a housing means capable of holding the separating legs in a secure vertical position. When positioned in the leg caps each separating leg extends up to and preferably substantially abuts the bottom of the upper tray. The separating legs of the top tray extend substantially to the top of the shell. Similar legs and receiving means are provided the bottom of the tower which legs abut the lowermost tray and serve as a rest or stand for the overlying tray sections.

Product is withdrawn from the column via outlet line 21 and is condensed in the condenser 23. A portion of the condensed product is returned as reflux to the column by means of line 25. Uncondensed product is drawn from the condenser by vapor outlet 24. The reflux can be deposited on the top tray via line 25 by any means known to the art but it is preferred that the reflux be distributed to the peripheral edges of the top tray by connecting reflux line 25 to a weir-spout arrangement similar to that employed in all but the lowermost tray of the column. (See FIGURE 1.)

When the column is in operation liquid will condense and accumulate on the trays to the levels of the tops of the weirs 32. Any liquid rising above this level flows down weir 32 and is projected by the spouts 35 provided the weir to the outer edges of the next lower adjacent tray near the peripheral vapor passage 30. Ascending vapor contacts the liquid above passage 30 and sieve holes or bubble caps on the peripheral edges of the tray if such are provided. The vapor velocity of the column is controlled so that the liquid is held at the tray level by the ascending vapors with little if any passage or seeping of liquid past any of the peripheral vapor passages 30, sieve holes or bubble caps.

I claim:
1. A distillation column comprising a closed, vertical, generally-cylindrical shell forming a wall, said wall having a feed inlet and product outlet and a plurality of spaced apart, generally-circular trays vertically spaced in the shell, said plurality of trays being free of attachment to the wall of the cylindrical shell and vertically removable from said shell, each of said plurality of trays having a smaller diameter than the internal diameter of the shell so that a continuous small peripheral vapor passage means is provided extending uninterruptably past said plurality of trays between the edge of said plurality of trays and the internal shell wall, said plurality of tray edges and small peripheral vapor passage means between said tray edges and said internal shell wall constituting bubbling zones in which vapor ascends through liquid held on the respective trays, supporting means for said trays, said small periphral vapor means being sufficiently small to hold liquid on said plurality of trays when said vapor ascends, said trays being provided with an opening in its mid-section and a wear extending above its respective tray surrounding said opening and a receiver for transporting descending liquid to the next lowermost tray.

2. The distillation column of claim 1 wherein the diametric ratio of the internal shell to the circular trays is about 1.05 to 1.15.

3. The distillation column of claim 2 wherein the supporting means are intermediately disposed, releasable, supporting legs.

4. The distillation column of claim 3 wherein the means for transporting liquid carries the liquid to the outer circumferential area of the lower adjacent trays and said means are spouts extending down to a level just above the next lower tray and are attached to the base of the weir at an angle that places the outlet of each of the spouts over a point on the next lower tray toward the tray edge at least about half the radius of the tray.

References Cited by the Examiner

UNITED STATES PATENTS

| | | | |
|---|---|---|---|
| 1,276,690 | 8/1918 | Pyzel | 202—158 |
| 1,513,354 | 10/1924 | Wadsworth | 202—158 X |
| 1,748,855 | 2/1930 | Teter | 202—158 X |
| 2,176,498 | 10/1939 | Hickman | 261—114 |
| 2,809,820 | 10/1957 | Stoops | 261—114 |
| 3,032,478 | 5/1962 | Bethea et al. | |
| 3,032,479 | 5/1962 | Norman. | |

NORMAN YUDKOFF, *Primary Examiner.*

F. E. DRUMMOND, *Assistant Examiner.*